United States Patent [19]

Sarver

[11] Patent Number: 5,759,286
[45] Date of Patent: Jun. 2, 1998

[54] METHOD OF RECYCLING AGRICULTURAL CHEMICAL RINSE WATER INTO AN IRRIGATION SYSTEM

[76] Inventor: Larry C. Sarver, 108 Fairway Landings Dr., Canonsburg, Pa. 15317

[21] Appl. No.: 721,441

[22] Filed: Sep. 27, 1996

[51] Int. Cl.[6] .................. B08B 3/00; E02B 11/00
[52] U.S. Cl. .................. 134/10; 47/1.01; 134/104.2; 137/3; 405/36; 405/37
[58] Field of Search ............ 210/96.1, 101, 210/136, 167, 170, 712, 739, 747, 767, 805, 705; 137/3, 87, 88, 98; 405/36, 37; 47/1.01, 58 C, 58 EM, 58 EC, 58 T; 134/10, 104.2

[56] References Cited

U.S. PATENT DOCUMENTS

| | | | |
|---|---|---|---|
| 1,696,704 | 12/1928 | Zellner | 210/167 |
| 3,375,666 | 4/1968 | Sutton | 61/13 |
| 4,015,366 | 4/1977 | Hall | 47/1.01 R |
| 4,112,972 | 9/1978 | Lajeuness | 137/597 |
| 4,895,303 | 1/1990 | Freyvogel | 239/61 |
| 4,917,304 | 4/1990 | Mazzei et al. | 239/64 |
| 5,106,493 | 4/1992 | McIntosh | 210/100 |
| 5,147,532 | 9/1992 | Leek, Jr. | 210/97 |
| 5,173,180 | 12/1992 | Stewart et al. | 210/167 |
| 5,192,426 | 3/1993 | DeCoster et al. | 210/117 |
| 5,217,323 | 6/1993 | Bilson | 405/43 |
| 5,423,339 | 6/1995 | Latimer | 134/104.2 |
| 5,498,330 | 3/1996 | Delle Cave | 210/103 |
| 5,543,063 | 8/1996 | Walker et al. | 210/167 |
| 5,560,831 | 10/1996 | Bladen et al. | 210/712 |
| 5,590,488 | 1/1997 | Casimaty et al. | 47/1.01 |
| 5,641,410 | 6/1997 | Peltzer | 210/96.1 |
| 5,647,977 | 7/1997 | Arnaud | 210/167 |

*Primary Examiner*—Joseph W. Drodge
*Attorney, Agent, or Firm*—Webb Ziesenheim Bruening Logsdon Orkin & Hanson, P.C.

[57] ABSTRACT

A method of recycling agricultural chemical rinse water is disclosed. The method includes the steps of providing a piece of equipment contaminated with an agricultural chemical, rinsing the agricultural chemical contaminated equipment with water to produce a rinse water containing the agricultural chemical, collecting the rinse water, supplying fresh water in a fresh water supply line of an irrigation system in fluid communication with a fresh water supply, injecting the rinse water into the fresh water supply line to produce irrigation water and irrigating vegetation with the irrigation water. A system for recycling agricultural chemical rinse water includes an irrigation system having a fresh water supply and an agricultural chemical rinse water inlet on the fresh water supply line, an agricultural chemical rinse water collection tank, an agricultural chemical rinse water injector in fluid communication with the rinse water inlet and tank and a pump for transferring the agricultural chemical rinse water from the tank to the injector.

15 Claims, 1 Drawing Sheet

METHOD OF RECYCLING AGRICULTURAL CHEMICAL RINSE WATER INTO AN IRRIGATION SYSTEM

BACKGROUND OF THE INVENTION

1. Field of the Invention

The present invention relates to a method and apparatus for recycling agricultural chemical rinse water into an irrigation system, and particularly, a recovery system for reclamation of the rinse water used to clean equipment contaminated with an agricultural chemical.

2. Prior Art

Most fields of crops, golf courses, commercial landscapes and residential landscapes are treated with a variety of biocides, fertilizers and/or other agricultural chemicals to control the growth of undesirable vegetation and presence of pests and to promote the growth of desirable vegetation. Equipment used to prepare solutions of such biocides and fertilizers as well as equipment used to disburse them over vegetation normally must be cleaned after their use. The term "biocide" is used to refer to a number of chemicals which are fatal to biological materials including but not limited to pesticides, fungicides and herbicides. Most such equipment is washed by rinsing the equipment with water. The resulting rinse water has been disposed of in the past by dumping the rinse water directly into municipal sewer systems or available bodies of water.

However, recently, many states have instituted controls on the dumping of such rinse water. For example, some states have instituted regulations which require triple rinsing of equipment used to disburse pesticides. Triple rinsing refers to the rinsing of equipment used to prepare or disburse pesticide three times, and thus, ensure that the equipment becomes clean. Such triple rinsing uses substantial amounts of water and produce substantial amounts of rinse water for disposal. Additional regulations have also been placed on the disposal of such rinse water. The rinse water containing the agricultural chemical must either be purified on site in filtration systems or the like or removed from the site for disposal by a third party. Both of these options are expensive.

Some wash water can be reused directly. For example, the reuse and recycling of domestic gray water is disclosed in U.S. Pat. Nos. 4,112,972; 5,106,493; 5,192,426; and 5,498,330. In these systems gray water is collected and reused in residential irrigation systems or in appliances in need of water. Because gray water is relatively innocuous, these reuse and recycling systems are not concerned with the environmental issues associated with disposal of potentially hazardous substances such as biocides or fertilizers.

Accordingly, a need remains for a method of recycling agricultural chemical rinse water which avoids the expense of filtration or remote disposal and which is environmentally sound.

SUMMARY OF THE INVENTION

The present invention meets this need and provides a method of recycling agricultural chemical rinse water and an apparatus therefor. The inventive method of recycling agricultural rinse water includes the steps of: (a) providing a piece of equipment contaminated with an agricultural chemical; (b) rinsing the agricultural chemical contaminated equipment with water to produce rinse water containing the agricultural chemical; (c) collecting the rinse water; (d) supplying fresh water in a fresh water supply line in fluid communication with a fresh water supply of an irrigation system; (e) injecting the rinse water into the fresh water supply line of the irrigation system to produce irrigation water; and (f) irrigating vegetation with the irrigation water. Preferably, the concentration of the agricultural chemical in the rinse water is determined before injection thereof into the fresh water supply.

The water is injected into the fresh water supply at a rate which dilutes the rinse water such that the resulting irrigation water is environmentally nonhazardous and preferably, compatible with the environment of the vegetation to be irrigated. The agricultural chemical may be a pesticide, an herbicide, a fungicide, a fertilizer and combinations thereof.

The agricultural chemical rinse water is collected by draining the rinse water into a sump or by the use of gravity and transferring, e.g., pumping, the rinse water to an inlet port on the fresh water supply of the irrigation system. The inventive method further includes preventing backflow of the irrigation water upstream in the fresh water supply.

The present invention also includes an agricultural chemical rinse water recycling system having means for producing a agricultural chemical rinse water, means for collecting the rinse water, means for injecting the rinse water into a fresh water supply of the irrigation system to produce irrigation water and means for irrigating vegetation with the irrigation water. The inventive recycling system may also include means for controlling the concentration of agricultural chemical in the irrigation water and/or means for preventing backflow of the irrigation water into the fresh water supply.

Preferably, the agricultural chemical rinse water recycling system includes an irrigation system having a fresh water supply line in fluid communication with a fresh water supply, an agricultural chemical rinse water inlet on the fresh water supply line, an agricultural chemical rinse water injector in fluid communication with the rinse water inlet and an agricultural chemical rinse water collection tank in fluid communication with the injector. Preferably, the system includes a pump for transferring the agricultural chemical rinse water from the tank to the injector. The system preferably includes an agricultural chemical concentration detector in fluid communication with the rinse water inlet and, preferably, upstream from the injector. The injector includes an injection rate controller for injection of the rinse water into the fresh water supply at a predetermined concentration.

DETAILED DESCRIPTION OF THE PREFERRED EMBODIMENTS

Figure 1:
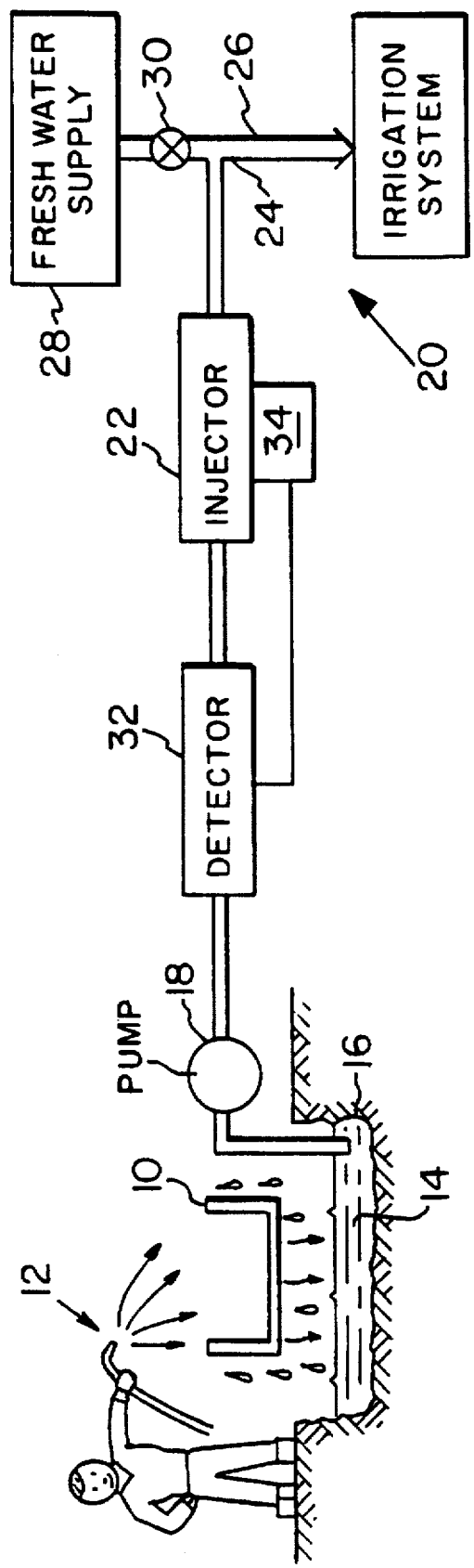
FIG. 1 is a schematic diagram of the agricultural chemical rinse water recycling system of the present invention.

As depicted in FIG. 1, when a piece of equipment 10 bearing an agricultural chemical such as a biocide or fertilizer or the like is rinsed with water 12, rinse water 14 containing the agricultural chemical is produced. By the term "biocide" it is meant any substance which may negatively impact flora or fauna and includes but is not limited to pesticides, herbicides and fungicides. The rinse water 14 is collected in a sump 16 and transferred preferably by a pump 18 to an irrigation system 20. Alternatively, the equipment 10 contaminated with the agricultural chemical may be placed on a platform or the like and the rinse water 14 can be collected in a container disposed underneath the apparatus to be rinsed.

The rinse water 14 is injected into the irrigation system 20 by an injector 22. The injector 22 is positioned at inlet port 24 of the fresh water supply line 26 in fluid communication with a fresh water supply 28 of the irrigation system 20. Preferably, the fresh water supply line 26 includes a check valve 30 or other means for preventing backflow of the injected rinse water 14 into the fresh water supply 28.

The inventive recycling system further includes an on-line detector 32 which detects the concentration of the agricultural chemical in the rinse water 14. The on-line detector 32 provides input to a rate controller 34 which adjusts the flow rate of the rinse water 14 injected into the fresh water supply 28 by injector 22. The flow rate of the rinse water 14 injected into the fresh water supply 28 is adjusted such that the concentration of the agricultural chemical in the irrigation water at a maximum is less than an environmentally hazardous concentration and preferably is compatible with the environment of the vegetation to be irrigated. The concentration of agricultural chemical in the irrigation water which is compatible with the environment of the vegetation is determined according to the potential environmental impact of the agricultural chemical, the vegetation to be irrigated, the presence of fauna and/or the presence or absence of ground water in the irrigation site.

The present invention further includes a method of recycling agricultural chemical wash water having the steps of providing a piece of equipment contaminated with an agricultural chemical, rinsing the agricultural chemical contaminated apparatus with water to produce a rinse water containing the agricultural chemical, collecting the rinse water, supplying fresh water in a fresh water supply line in fluid communication with a fresh water supply of an irrigation system, injecting the rinse water into the fresh water supply line of the irrigation system to produce irrigation water and irrigating vegetation with the irrigation water. The rinse water is injected into the fresh water supply line at a rate which dilutes the rinse water such that the irrigation water produced therein is environmentally nonhazardous and preferably is compatible with the environment of the vegetation to be irrigated.

Although the present invention has been described in detail in connection to the discussed embodiments, various modifications may be made by one of ordinary skill in the art without departing from the spirit and scope of the present invention. Therefore, the scope of the present invention should be determined by the attached claims.

What is claimed is:

1. A method of recycling agricultural chemical rinse water comprising the steps of:
    a) providing a piece of equipment bearing an agricultural chemical;
    b) rinsing said equipment bearing said agricultural chemical with water to produce a rinse water containing said agricultural chemical;
    c) collecting said rinse water;
    d) supplying fresh water in a fresh water supply line in fluid communication with a fresh water supply;
    e) controllably mixing said rinse water into said fresh water supply line to produce irrigation water; and
    f) irrigating vegetation with said irrigation water.

2. The method of claim 1 further comprising following step c) an intermediate step of determining the concentration of said agricultural chemical in said rinse water.

3. The method of claim 2 wherein said rinse water is mixed into said fresh water supply line at a rate such that the concentration of said agricultural chemical in said irrigation water is environmentally nonhazardous.

4. The method of claim 3 wherein said rinse water is mixed into said fresh water supply line at a rate such that the concentration of agricultural chemical in said irrigation water is compatible with the environment of said vegetation.

5. The method of claim 1 wherein said agricultural chemical is selected from the group consisting of a pesticide, an herbicide, a fungicide, a fertilizer and combinations thereof.

6. The method of claim 1 wherein step c) comprises draining said rinse water into a sump and pumping said rinse water from said sump to an inlet port on said fresh water supply.

7. The method of claim 6 further comprising preventing backflow of said irrigation water upstream into said fresh water supply.

8. An agricultural chemical rinse water recycling system comprising:
    means for rinsing a piece of equipment bearing an agricultural chemical to produce an agricultural chemical rinse water;
    means for collecting said rinse water;
    means for controllably mixing said rinse water into a fresh water supply of an irrigation system to produce irrigation water; and
    means for irrigating vegetation with said irrigation water.

9. The system of claim 8 further comprising means for controlling the concentration of agricultural chemical in said irrigation water.

10. The system of claim 9 further comprising means for preventing backflow of said irrigation water upstream into said fresh water supply.

11. An agricultural chemical rinse water recycling system comprising:
    an irrigation system having a fresh water supply in fluid communication with a fresh water supply line and an agricultural chemical rinse water inlet on said fresh water supply line;
    an agricultural chemical rinse water controllable mixer in fluid communication with said rinse water inlet;
    an agricultural chemical rinse water collection tank in fluid communication with said mixer, wherein said tank is adapted to receive agricultural chemical rinse water from a piece of equipment bearing an agricultural chemical when said equipment is rinsed with water; and means for producing said water.

12. The system of claim 11 further comprising:
    a pump for transferring said agricultural chemical rinse water from said tank to said inlet.

13. The system of claim 11 further comprising an agricultural chemical concentration detector in fluid communication with said rinse water inlet.

14. The system of claim 13 wherein said mixer comprises an injection rate controller for controlled mixing of said rinse water into said fresh water supply to produce irrigation water having a predetermined concentration of said agricultural chemical.

15. The system of claim 14 wherein said predetermined concentration is less than an environmentally hazardous concentration of said agricultural chemical.

* * * * *